(12) United States Patent
Nernberger et al.

(10) Patent No.: US 10,575,683 B2
(45) Date of Patent: Mar. 3, 2020

(54) QUIET APPLIANCE MOTOR HOUSING

(71) Applicant: Spectrum Brands, Inc., Middleton, WI (US)

(72) Inventors: Kroy Everett Nernberger, Madison, WI (US); Jacob Daniel Smith, Monona, WI (US)

(73) Assignee: Spectrum Brands, Inc., Middleton, WI (US)

( * ) Notice: Subject to any disclaimer, the term of this patent is extended or adjusted under 35 U.S.C. 154(b) by 156 days.

(21) Appl. No.: 15/673,557

(22) Filed: Aug. 10, 2017

(65) Prior Publication Data

US 2018/0263419 A1 Sep. 20, 2018

Related U.S. Application Data

(60) Provisional application No. 62/471,677, filed on Mar. 15, 2017.

(51) Int. Cl.

| *A47J 43/00* | (2006.01) |
|---|---|
| *A47J 43/07* | (2006.01) |
| *A47J 43/046* | (2006.01) |
| *H02K 5/20* | (2006.01) |
| *H02K 7/14* | (2006.01) |
| *H02K 9/06* | (2006.01) |

(52) U.S. Cl.
CPC ......... *A47J 43/0716* (2013.01); *A47J 43/046* (2013.01); *H02K 5/20* (2013.01); *H02K 7/14* (2013.01); *H02K 9/06* (2013.01)

(58) Field of Classification Search
CPC .... A47J 43/085; A47J 43/046; A47J 43/0716; H02K 5/20; H02K 7/14; H02K 9/06
See application file for complete search history.

(56) References Cited

U.S. PATENT DOCUMENTS

| 3,493,214 | A | * | 2/1970 | Edwards ............... A47J 43/046 |
| | | | | 241/282.2 |
| 4,742,257 | A | | 5/1988 | Carpenter |
| 5,273,358 | A | | 12/1993 | Byrne et al. |
| 6,069,423 | A | | 5/2000 | Miller et al. |
| 6,680,551 | B2 | | 1/2004 | Bates et al. |
| 7,042,121 | B2 | | 5/2006 | De Filippis et al. |
| 7,157,818 | B2 | | 1/2007 | Jones |

(Continued)

FOREIGN PATENT DOCUMENTS

| CN | 201855170 U | 6/2011 |
| JP | 06269360 | 9/1994 |

(Continued)

OTHER PUBLICATIONS

International Search Report from co-pending PCT Application No. PCT/US2018/022663, 5 pages, dated Jul. 6, 2018.

*Primary Examiner* — Anshu Bhatia
(74) *Attorney, Agent, or Firm* — Kagan Binder, PLLC

(57) ABSTRACT

A base power unit for a blender includes a housing supporting a motor coupled to a drive shaft, the drive shaft coupled to a drive element. The base power unit also includes a fan coupled to the drive shaft, where the fan is located between the motor and the drive element. The housing defines an air flow path passing the motor, where the fan receives air after the air enters the housing through an intake vent, and the fan causes the air to pass out of the housing through an exit vent.

17 Claims, 11 Drawing Sheets

(56) References Cited

U.S. PATENT DOCUMENTS

| | | |
|---|---|---|
| 7,320,542 B2 | 1/2008 | Tai |
| 8,579,220 B2 | 11/2013 | Buzian |
| 8,690,116 B2 | 4/2014 | Kolar et al. |
| 8,752,481 B2 | 6/2014 | Williams et al. |
| 9,084,512 B2 | 7/2015 | Boozer |
| 2005/0152215 A1 | 7/2005 | Stuart et al. |
| 2008/0098905 A1* | 5/2008 | Steiner ................ A47J 43/0716 99/451 |
| 2016/0256010 A1* | 9/2016 | Le ....................... A47J 43/0716 |
| 2016/0348697 A1 | 12/2016 | Gilliland et al. |
| 2018/0028020 A1* | 2/2018 | Sapire ................... A47J 43/044 |

FOREIGN PATENT DOCUMENTS

| | | |
|---|---|---|
| JP | 2007143868 | 6/2007 |
| WO | 9101450 | 2/1991 |
| WO | 2009106709 A2 | 3/2009 |
| WO | 2009049355 A1 | 4/2009 |

\* cited by examiner

QUIET APPLIANCE MOTOR HOUSING

CROSS-REFERENCE TO RELATED APPLICATIONS

This application claims priority to U.S. Provisional Patent Application No. 62/471,677, filed Mar. 15, 2017, the entire contents of which are incorporated herein by reference in its entirety.

BACKGROUND

Aspects of this disclosure are directed to motor housings, and in particular motor housings for electric appliances such as blenders.

Electric appliances have become commonplace in a variety of settings, such as home kitchens, as well as commercial uses, such as restaurants, cafeterias, coffee shops, and bars in a variety of settings. One category of electric appliance includes mixers and various forms of blenders. At their most basic, blenders include a water-tight or sealed container atop a lower power unit. A blender typically utilizes an electric (or otherwise powered) motor to drive a vertical drive shaft, where the drive shaft turns a blade or mixing element located within the blender container. A substantial amount of revolutions per minute (RPM) and corresponding rotational blade force are then used to mix, agitate, or "blend" the contents of the container.

In the process of blending, the lower power unit uses the motor to convert electricity from a wall source (usually alternating current) or battery (usually direct current) into rotational force through the shaft. The drive shaft can then turn a blending blade in the container, above. During blending, the motor in the lower power unit inevitably creates undesirable heat. If the temperature of a motor or other components become elevated, parts, connections, and other blender components can weaken, melt, or otherwise break. In order to avoid such problems, a blender typically also includes a cooling fan coaxially mounted to the drive shaft driven by the motor. Typically, the cooling fan is mounted below the motor to be cooled, such that the fan blades of the cooling fan can expel hot air from the motor directly to the surrounding environment.

Blenders are very often stored and then used in open areas, such as a countertop within a kitchen or an open bar, café, or coffee shop. As such, a very common complaint or irritation is that blenders create a substantial quantity of wide-band sound when in use, otherwise considered to be noise. In a typical blender, noise (conventionally measured in the base-10 logarithmic units of decibels acoustic [dBA]) originates from a variety of components during a blending process, but most notable are the actual crushing or blending of a food or beverage product in the container and the noise created by the motor and cooling fan and electric motor apparatus, the latter which forms the primary focus of this application. Sufficient cooling being considered a necessity for safe operation, the motor and cooling fan portion of blenders have been well-established for many years, and known configurations include the motor mounted at or near the middle of the roughly cylindrical base power unit, with the cooling fan located below the motor (and therefore the cooling fan being located closer to the surface on which the blender is placed). More recently, a desire has arisen to improve the quietness of blenders during blending (i.e., reduce the noise emitted). Existing methods for quieting blenders have generally had limited success.

SUMMARY

In various aspects, this disclosure describes structures related to electric appliances such as blenders including housings configured to reduce noise exiting the electric appliances during use.

In a first aspect, a base power unit for a blender includes a housing supporting a motor. The base power unit also includes the motor coupled to a drive shaft. The base power unit also includes the drive shaft coupled to a drive element. The base power unit also includes a fan coupled to the drive shaft, where the fan is located between the motor and the drive element. According to the first aspect, the housing defines an air flow path passing the motor, where the fan receives air after the air enters the housing through an intake vent, and the fan causes the air to pass out of the housing through an exit vent.

According to a first variation of the first aspect, the housing further supports a shroud configured to direct and concentrate air passing the fan. According to another variation of the first aspect, the shroud is further configured to support the motor to the housing. According to another variation of the first aspect, the fan is a radial fan with a plurality of fan blades. According to another variation of the first aspect, the fan includes a disc portion, where the plurality of fan blades are mounted to the disc portion as an angle of ninety degrees. According to another variation of the first aspect, the fan is configured to receive air from the intake vent after the air flow path passes the motor. According to another variation of the first aspect, the housing includes a lower housing and an upper housing attached in a clamshell arrangement. According to another variation of the first aspect, the intake vent and the exit vent are separated by an air flow divider wall. According to another variation of the first aspect, the housing supports at least one baffle located in the air flow path.

In a second aspect, a blender includes a container, a blade located within the container, and a base power unit including a housing supporting a motor, where the base power unit is configured to support the container. In the second aspect, the motor is coupled to a drive shaft, and the drive shaft is coupled to a drive element, wherein the drive element is coupled to the blade. A fan is coupled to the drive shaft, and the fan is located between the motor and the drive element. Also according to the second aspect, the housing defines an air flow path passing the motor, where the fan receives air after the air enters the housing through an intake vent, and the fan causes the air to pass out of the housing through an exit vent.

According to a first variation of the second aspect, the housing further supports a shroud configured to direct and concentrate air passing the fan. According to another variation of the second aspect, the shroud is further configured to support the motor to the housing. According to another variation of the second aspect, the fan is a radial fan with a plurality of fan blades. According to another variation of the second aspect, the fan includes a disc portion, where the plurality of fan blades are mounted to the disc portion as an angle of ninety degrees. According to another variation of the second aspect, the fan is configured to receive air from the intake vent after the air flow path passes the motor. According to another variation of the second aspect, the housing includes a lower housing and an upper housing attached in a clamshell arrangement. According to another variation of the second aspect, the intake vent and the exit vent are separated by an air flow divider wall. According to another variation of the second aspect, the housing supports at least one baffle located in the air flow path.

In a third aspect, an electric appliance includes a housing defining an air flow path passing a motor. The electric appliances includes a drive shaft coupled to the motor and coupled to a drive element. The electric appliance includes a fan coupled to the drive shaft, where the fan is located between the motor and the drive element. According to the third aspect, the motor is supported by the housing, and the fan receives air after the air enters the housing through an intake vent, causing the air to pass out of the housing through an exit vent.

These and various other features and advantages will be apparent from a reading of the following detailed description.

BRIEF DESCRIPTION OF THE DRAWINGS

Corresponding reference characters indicate corresponding parts throughout the several views of the drawings.

DETAILED DESCRIPTION

Disclosed are structures and methods relating to electric appliances for processing a food or beverage product.

Figure 1:
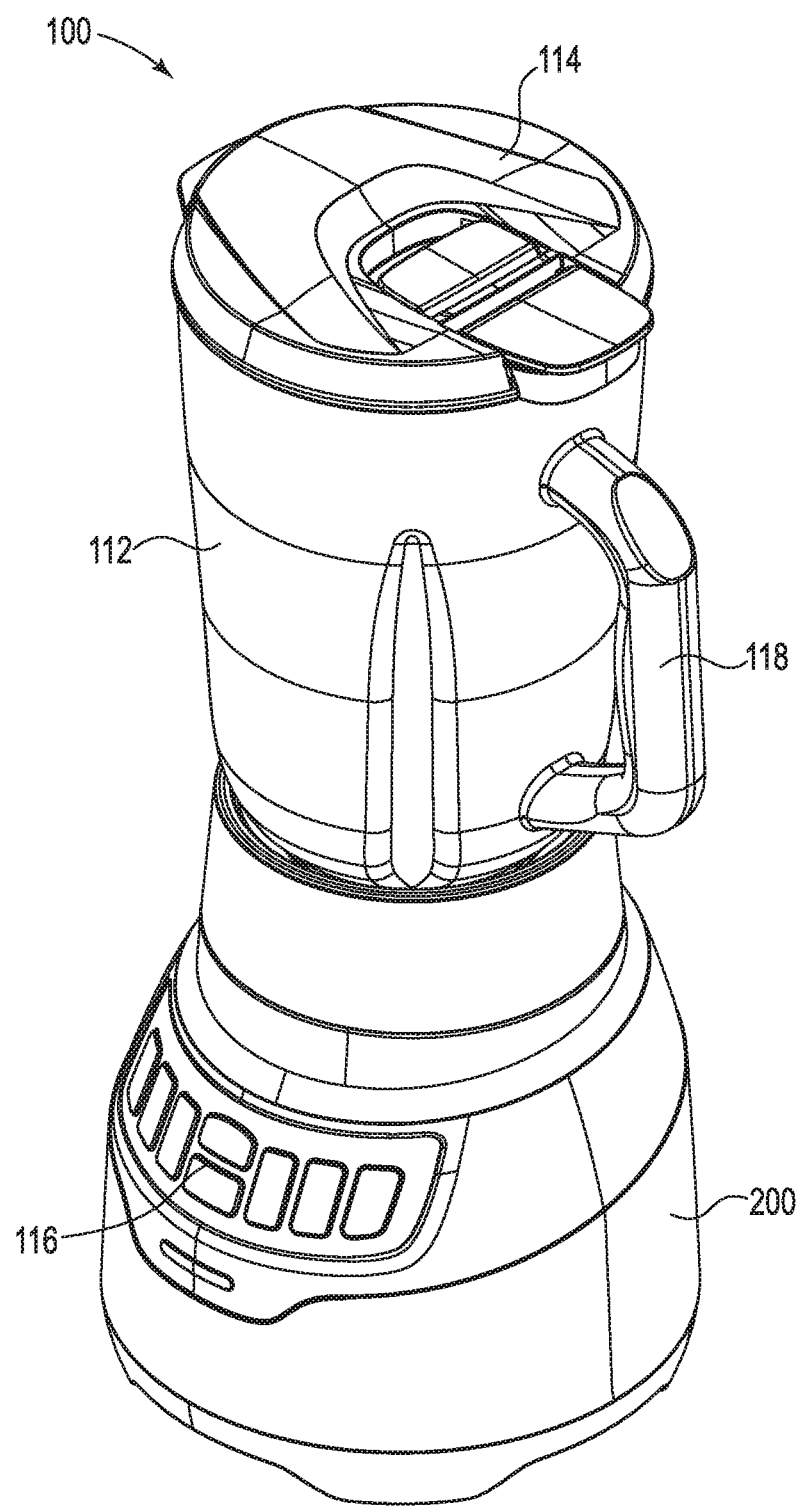
FIG. 1 is a perspective view of an assembled electric appliance, according to various embodiments.

Referring now to the drawings, and in particular to FIG. 1, a perspective view of an assembled electric appliance is shown, according to various embodiments. In particular the electric appliance shown is a blender 100. Blender 100 can include a base power unit 200, with a container 112 configured to be stably set atop base power unit 200. During operation of blender 100, heat may be created within base power unit 200, and therefore it is desirable to manage thermal characteristics of the base power unit 200.

Food, beverage, or other (solid and/or liquid) products may be placed into the container 112 for blending or mixing. Container 112 can preferably include a handle 118 to allow for container 112 to be picked up and maneuvered with greater control. Blender 100 can also optionally include a lower aperture at a lower end thereof (not shown) of various forms. Examples of lower apertures can be relatively small or relatively large, and can include mechanical and/or rotational features such as bearings configured to interface with blender 100 motor and/or a blender blade within container 112. The lower aperture may be configured as a conduit so that a drive shaft (not shown) can pass therethrough and supply rotational mechanical energy from the base power unit 200 to a blade (not shown) configured for mixing, churning, and/or cutting contents of container 112. Preferably, the lower aperture in the container 112 is configured such that any contents in the container 112 do not leak through lower aperture provided the container 112 is properly attached to or placed on the base power unit 200. Preferably, the lower aperture of the container 112 is configured such that leaks are avoided before, during, or after a blending process. Following blending, the contents of the container 112 can be poured out or otherwise removed from the container for consumption. Blender 100 may be supplied with electric power by a cord (not shown) configured to be plugged into an electric wall outlet.

Blender 100 can have a wide range of uses including the mixing of various foods, beverages, and combinations thereof into a crushed, puréed, or liquid form, so as to be consumed as one homogenous liquid. Blender 100, as shown, includes a motor in the base power unit 200 that is preferably configured to power the blade and a cooling fan 212 during operation and also support (and/or interlock) with container 112, above.

Blenders of the present invention may take traditional full-size (e.g., about one liter to several liters of container 112 capacity) forms, or various smaller or single-serve use (e.g., less than one liter) forms, according to various embodiments. The base power unit 200 and corresponding container 112 may therefore be made of varied, but preferably corresponding shapes and sizes, according to various needs and desires.

Figure 2A:
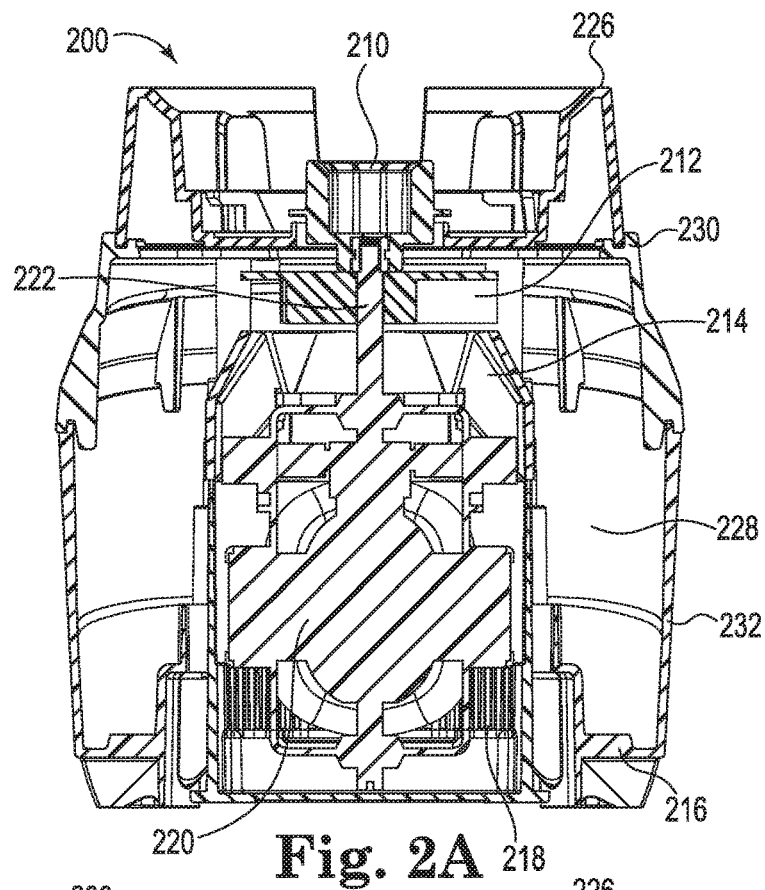
FIG. 2A is a cross-section view of a base power unit of an electric appliance, according to various embodiments.

During a blending operation and process, the blade may be caused to spin by a motor 220 and a vertical-mounted drive shaft 222 (shown in greater detail in FIG. 2A) by way of a blender drive nut 210 (also shown in greater detail in FIG. 2A). The blade thus can spin and abruptly and violently strike and impact liquid and/or solid products within the container 112 based on inputs received at a control panel 116 of blender 100. Particularly if liquid is present in the container 112, the blade when spinning may also cause a churning of the container 112 contents, facilitating even mixing during and after blender 100 operation. The container 112 may have an open or partially open top end to facilitate cleaning, pouring, and adding liquids and/or solids to the container prior to, during, or following a blending process.

To reduce spills and/or splattering during blending, and to muffle a portion of blending noise due to the blade spinning, a removable lid 114, (preferably made of a plastic or rubber substance) may at least partially cover and seal the top of container 112. Preferably, container 112 itself is solid and water tight, including around a blade and shaft (not shown) such that food or beverage within container 112 does not spill or leak onto the base power unit 200 through the lower aperture of the container 112 or out the top of container 112.

Various functions of the blender 100 can be controlled by a user at control panel 116. According to some embodiments, the control panel 116 can include functions such as speeds, settings, and modes, such as "pulse" mode, where only a very short pulse of blending occurs per activation. Control panel 116 can include mechanical buttons, toggles, and/or switches. Control panel may optionally include one or more touchscreen, visual, and/or haptic functions. According to other embodiments, control panel 116 may take the form of audible or voice-recognition aspects, and various artificial intelligence "smart" features may also be present to facilitate use. The blender 100 may be network and/or cloud connected, and may be updated or controlled remotely according to some embodiments. Before or after a blending process is complete, handle 118 can be used to easily remove the container 112 from the base power unit 200, located below. Typically, the various blender 100 components may be physically separable from one another so as to facilitate the disassembly and cleaning of the various parts. Blender 100 components may then be configured to be easily reassembled in a similar fashion. The container 112 and handle 118 thereof may preferably be made of a durable and preferably clear substance, such as various plastics or glass, such as tempered glass.

According to existing blender layouts, a blender motor cooling fan is positioned below the motor, and the high revolutions per minute (RPM) of the cooling fan blades passing adjacent lower air vents tends to cause an undesirable air turbulence near the lower air vents, which in turn causes more noise to be created and escape the existing blender. If a blender's cooling fan is oriented so it blows air out of the air vents that are adjacent to the fan, the noise from the motor also more easily travels out these air vents and into the room to the ears of a user. This can be exacerbated by the noise travelling downstream with the air. Sound travels faster when traveling in a direction of moving air, and the pitch of the emitted sound can also be affected (e.g., raised to a higher pitch) as a result.

A significant challenge of quieting electric appliances, such as blenders (e.g., blender 100), involves a sound-air flow trade-off that exists with respect to cooling of a motor within blender base power unit 200. Direct, unfettered air flow can be efficient for cooling through forced convection, but a direct sound path is also the most efficient way for noise to escape the blender base power unit 200. The term "air" is used throughout, but other fluids, such as various gasses, are also contemplated, with respect to all embodiments, herein. For instance, using a circuitous air flow path including baffles for cooling air flow can cause a blender base power unit housing to absorb at least some of the sound, reducing the sound emitting from the blender base power unit. However, baffles can also tend to reduce overall air flow efficacy when used in known configurations. Notably, if a cooling fan receives an insufficient air flow (e.g., a low-pressure area) at an air intake for cooling, the fan would then need to spin faster or more forcefully in order to achieve adequate cooling via air flow of fresh air from the surrounding environment.

With reference now to FIGS. 2A-4B, various views are shown that depict an embodiment of an improved base power unit 200.

Described herein are embodiments that include an advantageous placement and mounting of the cooling fan 212 (also referred to herein as "fan") of motor 220 counterintuitively deeper inside the base power unit 200 upper housing 230, when assembled. Preferably, the fan 212 is mounted above the electric motor 220, as shown. By operatively positioning and mounting the fan 212 above the motor 220 and locating a fan support shroud 214 (also referred to herein as "shroud") between the two, the fan 212 is structurally spaced farther away from the base power unit's 220 air vents 218, 216, which can reduce the noise previously generated when the tips of cooling fan blades passed directly by the air vents similar to air flow input vents 218. In so doing, the overall noise produced by the blender 100 while in use can be decreased. By moving the fan 212 to a position above the motor 220 (and therefore closer to container 112), the air flow (or air circulation) path 224 can also be reversed, where the motor 220 and fan 212 "pulls" (instead of pushing in the opposite direction) cooler, ambient air along the hot motor 220, causing less of the motor 220 noise to escape the housing components (upper housing 230 and lower housing 232) of the base power unit 200.

Alternatively, the air flow path 224 can be "pushed" by the fan, which may still be beneficial when implemented in the shown configuration. As shown, one or more housing exit chambers 228 can be included in lower housing 232, and may serve to collect air flow before exiting air flow exit vent 216.

An example cross-section view of an example blender base power unit 200 is shown in FIG. 2A. Motor 220 is located in the lower center portion of the base power unit, and drives drive shaft 222. Drive shaft 222 in turn is mechanically and rotatably coupled to both the cooling fan 212 and a blender drive nut 210, which may preferably include a spline, threading, or other attachment configurations for the blender blade (not shown). Between the motor 220 and the fan 212 is shroud 214. Also shown are air flow intake vent(s) 218 and air flow exit vent(s) 216. Upon being driven by fan 212 above the motor, heated air can pass through one or more housing exit chamber 228 before passing through exit vents 216.

Figure 2B:
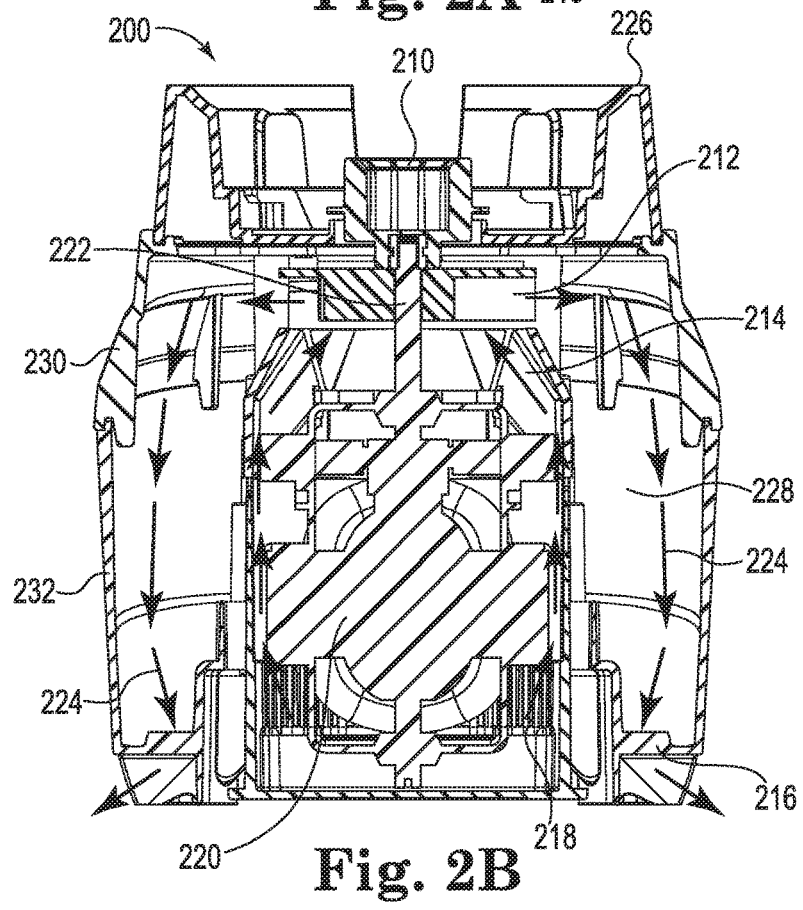
FIG. 2B is the cross-section view of the base power unit of the electric appliance of FIG. 2A, with an example heat flow path, according to various embodiments.

To further clarify the configuration of FIG. 2A, FIG. 2B is a cross-section view 202 that is similar to FIG. 2A, but illustrates with arrows a preferable air flow path 224 through the shown components of base power unit 200. As illustrated, ambient air initially enters intake 218, passes by the motor 220, passes through shroud 214, reaches the fan 212, flows through at least one housing exit chamber 228 of lower housing 232, and then exits through one or more air flow exit vents 216.

Turning now to a first embodiment of the blender base power unit 200 design of the present invention, base power unit 200 of blender 100 can include one or more structural parts, including an upper housing 230 and a lower housing 232. Upper housing 230 can include a container support ring 226 for supporting container 112. A motor can be located within lower housing 232. Motor 220 is configured to rotatably drive the drive shaft 222, and the upper housing 230 and lower housing can together help define a motor cooling air flow path 224. Motor 220 can be supported at least in part by shroud 214, and can preferably be connected to the upper housing 230 and the lower housing 232 of the base power unit 200. Shroud 214, as shown, can be shaped to modify, direct, and/or adjust an air flow path 224 in addition to partially connecting motor 220 to base power unit 200. The motor 220 can be supported in position in the lower housing 232 and the drive shaft 222 can be connected to the motor 220 such that the motor 220 can rotatably drive cooling fan 212 located above the motor 220. Preferably, the same drive shaft 222 can also drive a blender blade of blender 100, preferably coaxially with fan 212. Lower housing 232 can preferably include one or more air flow input vent(s) 218 and one or more air flow exit vent(s) 216. Lower housing 232 can also define one or more housing exit chambers 228, each preferably located adjacent to and in fluid communication with at least one air flow exit vent 218. Each housing exit chamber 228 of lower housing 232 can also preferably be in fluid (e.g., air) communication with the fan 212. Lower housing can be formed to separate intake and exit fluid flow (e.g., air flow), and direct fluid flow with the motor 220 and air flow input vent(s) 218 from the housing exit chamber 228 and air flow exit vent(s) 216. Therefore, preferably, housing exit chambers 228 will generally hold relatively hot air prior to discharge through adjacent air flow exit vent(s) 216.

Upper housing 230 and lower housing 232 can include more components than listed, herein. The motor 220 and fan 212 are supported by the upper 230 and lower housing 232, but may be placed in various configurations provided that air flow path 224 reaches fan 212 and motor 220.

According to preferable embodiments, structural container support ring 226 is shaped to support and guide placement of container 112. The container support ring 226 may be generally toroidal in shape and may be located atop base power unit 200. Container support ring 226 includes a recessed circular indentation in a middle of the container support ring 226 where a blender drive nut 210 can be located, in addition to an applicable seal mechanism (not shown) for container 112 of FIG. 1. Container 112 may include a complementary indentation (not shown) facilitating engagement and placement of container 112 on the container support ring 226.

Air flow path 224 can be defined by lower housing 232 of power base unit 200 including air flow inlet vent(s) 216, which can preferably define an origin for the blender air flow path 224. Upon ambient air entering air flow input vent(s) 218, the air can proceed upward, either taking a path through components or openings of motor 220, around the motor 220, or both. The motor may be generating heat as the air flow path 224 passed by, thereby heating the air. The air flow path 224 can then proceed to enter shroud 214 (described in greater detail in FIGS. 6A and 6B). Shroud 214 can then adjust the air flow path 224. According to some embodiments, the shroud 214 can be placed above and be attached to the motor 220, which can direct and/or concentrate air entering the cooling fan 212. As the air passes through the shroud 214, a venturi effect can be experienced by the air flow path 224, where a narrower output (top) than input (bottom) of the shroud 214 causes adjustment and certain air flow characteristics before, during, and after passing through shroud 214, according to certain preferable embodiments. For example, the air flow path 224 may narrow, while the corresponding air flow speed may increase. A section 616 (see FIG. 6B) of the shroud 214 closest to the fan 212 can be circular in shape, so that rotating fan 212 blade tips are mounted to pass a solid, consistent surface of the shroud 214 at a relatively narrow, proximate separation distance to reduce noise. The air flow path 224 may then enter a relatively low pressure area proximate to fan 212, and may proceed to enter the fan 212 (described in greater detail in FIG. 9). Cooling fan 212 is preferably a radial fan, and is preferably mounted to the drive shaft 222 and above the motor 220, causing air to be drawn vertically upward past the motor 220 and expelled radially toward housing exit chamber 228. The air flow path 224, once reaching one or more housing exit chamber may experience a relatively high pressure (e.g., higher than one atmosphere [101.3 kilopascals] of pressure) area, which may facilitate the air flow path 224 leading out air flow exit vent(s) 216. As shown with respect to FIGS. 4A and 4B, an air flow divider wall 414 may be present on the bottom of base power unit 200, which can reduce the likelihood that the air flow path 224 (including warmer or hot air) will immediately pass from air flow exit vent 216 to air flow intake vent 218.

This placement of fan 212 above the motor 220 in combination with the fan 212 and shroud 214 can preferably reduce blender noise in at least two ways. In a first way, the fan 212, in this configuration, is farther from the air vents 218 of the motor housing. As a result, the blades of the fan 212 are not passing near the air vents 218 and the fan 212 causes less undesirable air turbulence and noise. Notably, this can mean that the amount of actual noise created inside the blender can be reduced, irrespective of the preferable, internal placement of the fan 212 above the motor 220. In a second way, the fan 212 can be configured to have a rotational direction and blade pitch in order to draw air upward past the motor 220 and through shroud 214, making it more difficult for motor 220 or fan 212 noise to escape the (input) air vents 218 nearest the motor. This can be at least due in part to the sound waves travelling against the air flow direction (shown as 224 in FIG. 2B). As less of the noise exits the air vents 218 nearest the motor 220, more of the sound waves are absorbed by the housing material (e.g., plastic or the like). As a result, as described, the overall noise level exiting the lower housing 232 of base power unit 200 can be decreased twofold.

Based on embodiments of disclosed configurations, testing was performed on examples of blenders of the present invention. According to one test, an audible sound level for a standard blender, with a cooling fan mounted below the motor was measured at 82.1 dBA. In contrast, a blender equipped with a configuration according to this application was 78.6 dBA. 78.6 dBA is 22% quieter (i.e., less sound intensity) than the 82.1 dBA of the prior art blender with the fan-below-motor configuration as decibels use a logarithmic scale, where each successive decibel is larger than the last. In addition, an objectively noticeable difference in sound level and pitch, including a lowering of the pitch of the motor 220 noise was observed during testing. By reversing the air flow compared to existing blenders, in addition to locating the cooling fan 212 above the motor 220 (and therefore between motor 220 and blender drive nut 210), the sound waves of the motor 220 escape the intake vents 218 near the motor 220, are travelling "upstream" in the blender air flow path 224. This serves to slow the sound waves down, which therefore lowers the pitch of the sound, giving noise that exits the blender a more pleasing characteristic.

Figure 3:
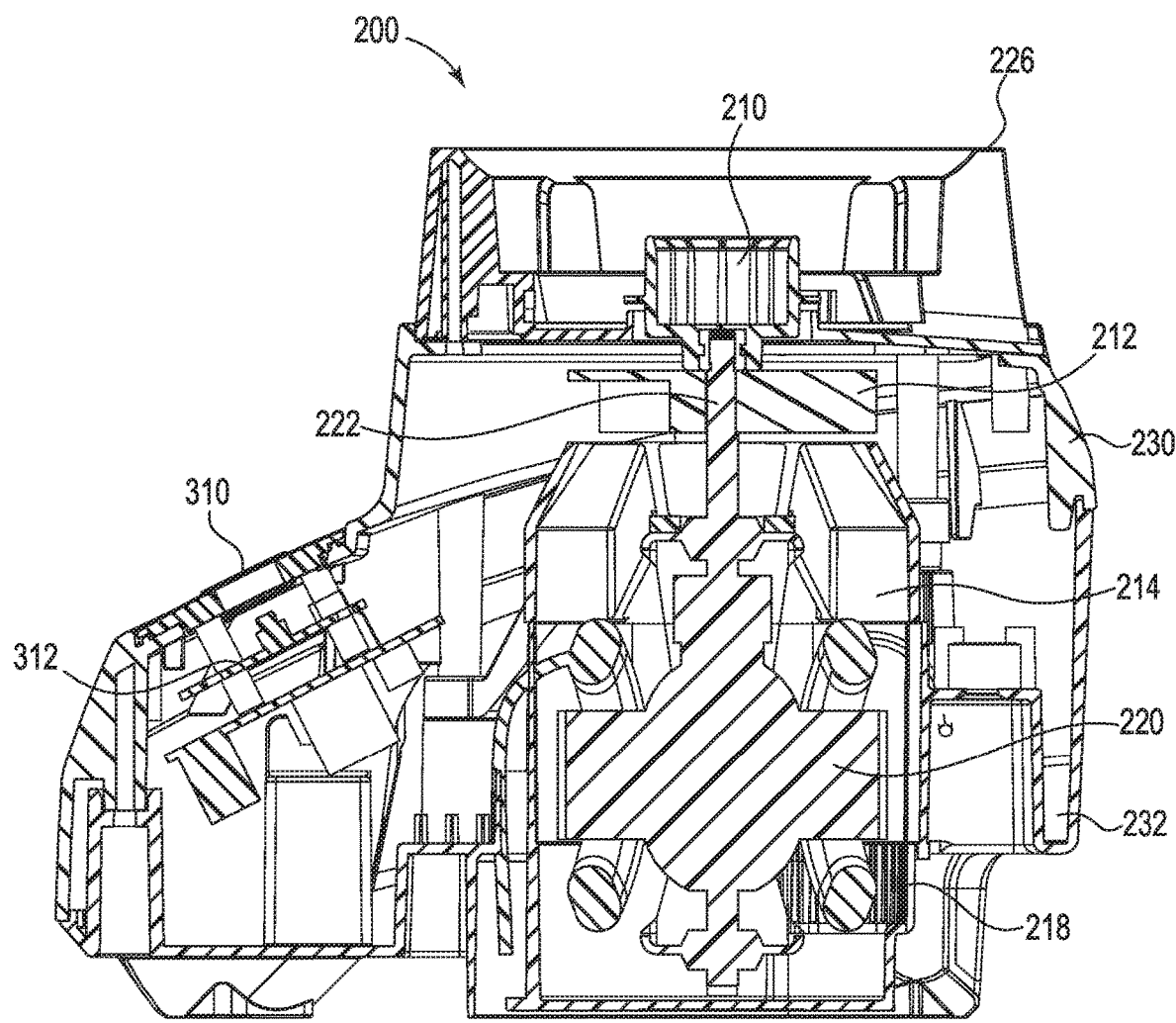
FIG. 3 is a transverse cross-section view of the base power unit of the electric appliance of FIG. 2A, according to various embodiments.

FIG. 3 shows a cross-section view transverse to FIGS. 2A and 2B of base power unit 200 described with respect to FIGS. 2A and 2B from a transverse angle, rotated ninety-degrees about a vertical axis. Illustrated are the motor 220, shroud 214, fan 212, drive shaft 222, blender drive nut 210, container support ring 226, and air flow intake vent(s) 218 from FIGS. 2A and 2B. Also shown is a control panel 310 and (optional) mechanical control linkages 312, which can preferably include selective actuation of blender functions and a power switch for the blender.

Figure 4A:
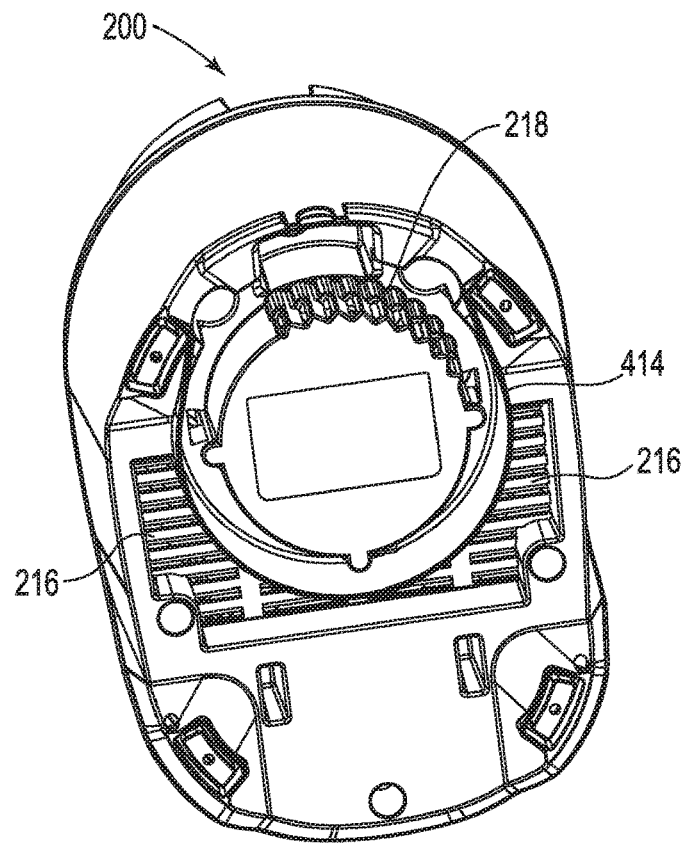
FIG. 4A is a first view from underneath a base power unit of an electric appliance, according to various embodiments.
Figure 4B:
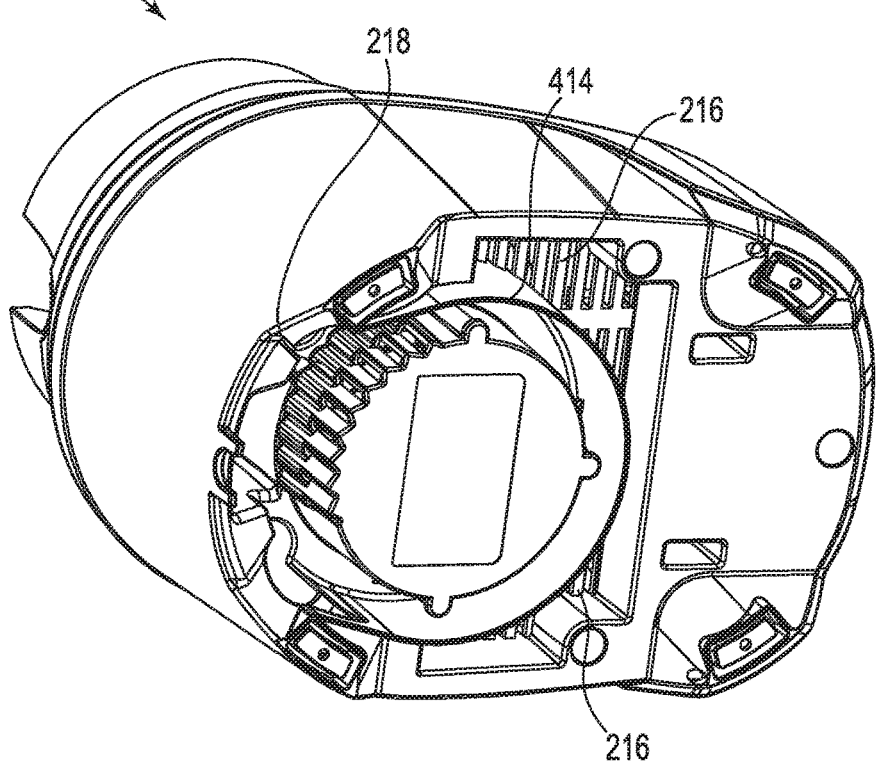
FIG. 4B is a second view from underneath a base power unit of an electric appliance, according to various embodiments.

Now in perspective form, FIGS. 4A and 4B show two low-angle perspective views of assembled base power unit 200 of the present invention. Notable, illustrated features include the air flow intake vent(s) 218 and one or more air flow exit vent(s) 216. As shown, the base power unit 200 preferably has a roughly elongated, two-lobed circular shape when viewed from below. Various configurations of the base power unit 200 are contemplated, including diverse arrangements of the intake vent(s) 218 and exit vent(s) 216. As shown, a partial-circle shaped air flow divider wall 414 preferably extends to a lower portion of the blender base power unit 200, and preferably assists thermal separation of cross air flow from hot exhaust air from exit vent(s) 216 immediately re-entering cooler air flow intake vent(s) 218. Various other vent sizes and shapes are contemplated, herein. For example, air flow intake vent(s) and/or air flow exit vent(s) may be located anywhere on upper housing 230 or lower housing 232, as long as the air flow path 224 passes the fan 212 and motor, as described, herein. In addition, the various intake 218 and exit 216 vents can be reversed simply by changing the direction of spin of fan 212, although preferably the air flow path 224 passes motor 220 before reaching fan 212 for preferred noise reduction.

Figure 5A:
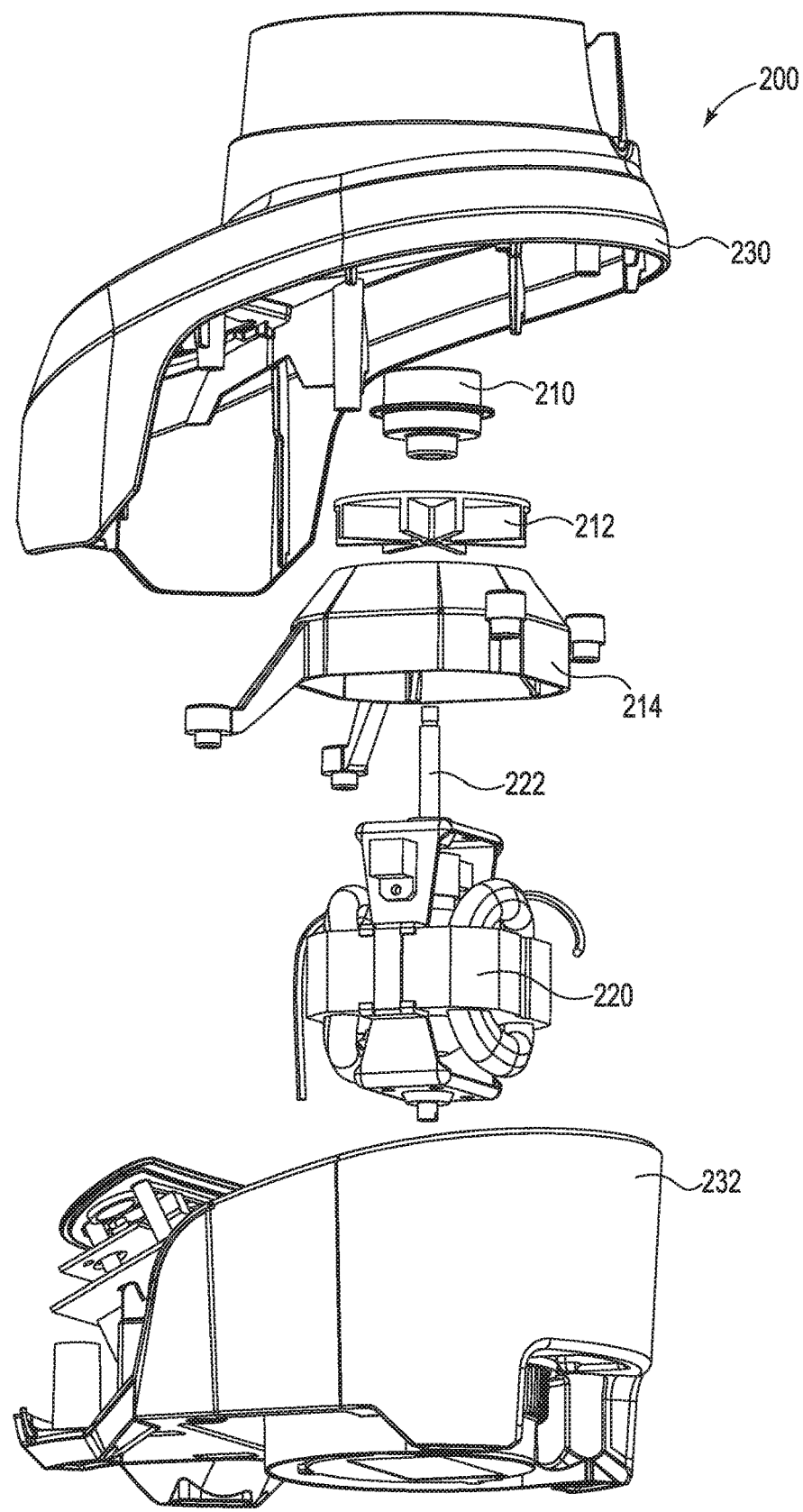
FIG. 5A is a low-angle exploded view of a base power unit of an electric appliance, according to various embodiments.
Figure 5B:
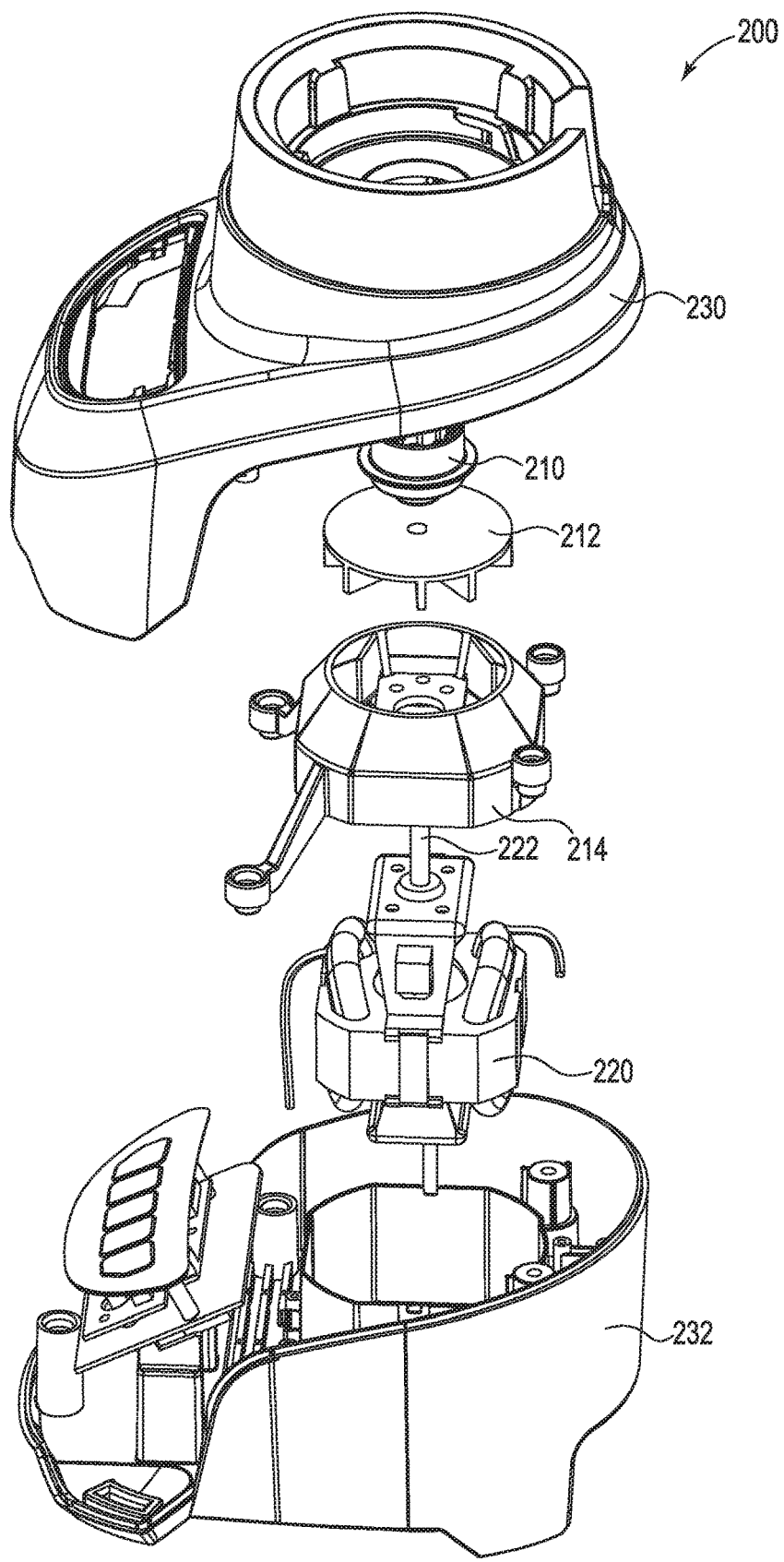
FIG. 5B is a high-angle exploded view of a base power unit of an electric appliance, according to various embodiments.

FIG. 5A is a low-angle exploded view of a base power unit 200 of a blender, and FIG. 5B is a high-angle exploded view of a base power unit 200 of the same blender.

Upper housing 230 and lower housing 232 may together form a "clamshell" style configuration, and may together form an outline of base power unit 200. Upper housing 230 and lower housing 232 may be configured to be fixedly attached to each other when assembled, including using fasteners, snaps, adhesives, and/or pressure fitment, among other ways. Upper housing 230 and lower housing 232 may by design be made of an opaque material (e.g., plastic or metal) and may obscure the visibility of internal components from the outside by a user when assembled. However, when disassembled (e.g., prior to assembly), as shown, a construction of the electric appliance (e.g., blender) can be better understood and illustrated. Upper housing 230 and lower housing 232 may be made of sound absorbing and/or sound blocking material, and connection points may be closely-fitted to reduce sound leaking through the upper housing 230 and lower housing 232.

Selected operative blender base power unit 200 components, are shown from bottom to top. Various operative components preferably include a lower housing 232, an electric motor 220, and drive shaft 222 driven by the motor 220, shroud 214 (shown in greater detail with respect to FIGS. 6A and 6B), fan 212, a blender drive nut 210, and an upper housing 230. The various components may preferably be assembled in the order shown, or variations may also be made where appropriate. The various components can preferably be aligned and assembled coaxially, as shown, or may be assembled in any other appropriate order, configuration, or way. Various fasteners, including screws, snaps, adhesives, and/or pressure fitments may be used to attach and assemble the various components to upper housing 230 and lower housing 232, and various components to one another, as contemplated herein. As shown, various components can be shaped to have a complementary fit, which may reduce the quantity of separate fasteners required for assembly.

Figure 6A:
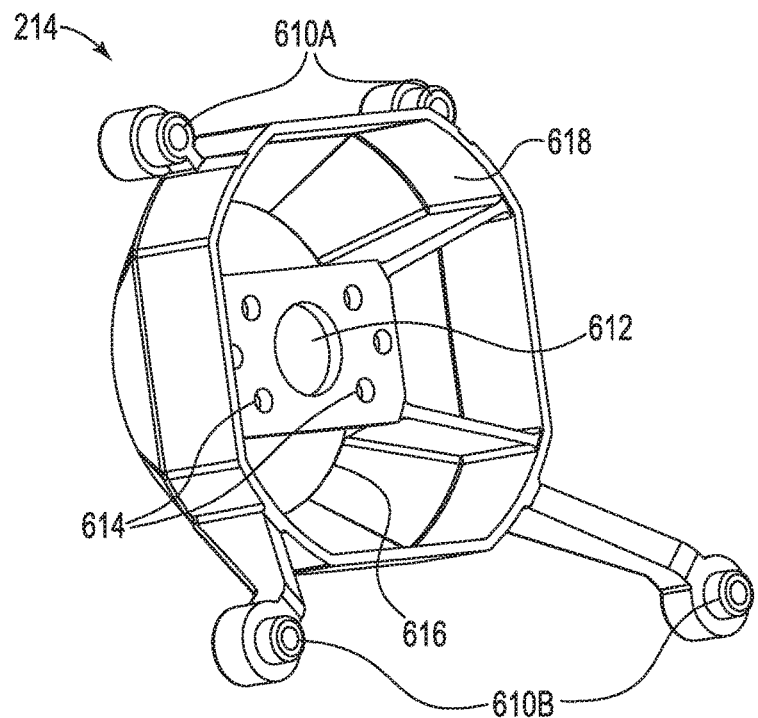
FIG. 6A is a low-angle view of a fan support shroud, according to various embodiments.
Figure 6B:
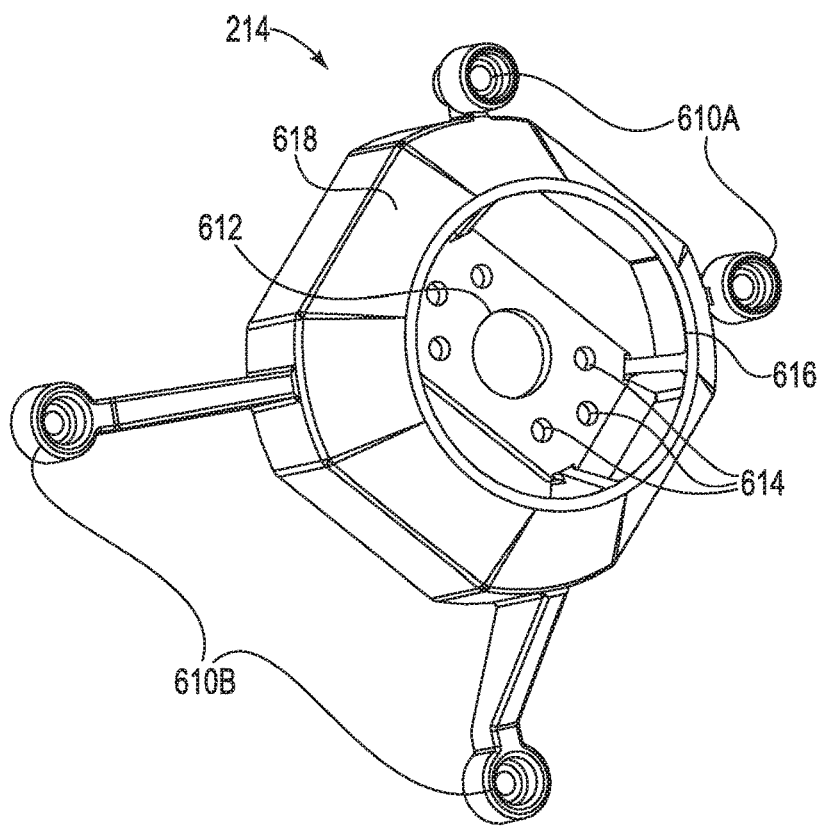
FIG. 6B is a high-angle view of the fan support shroud of FIG. 6A, according to various embodiments.

FIG. 6A is a low-angle view of a fan support shroud 214, and FIG. 6B is a high-angle view of the fan support shroud 214 of FIG. 6A, according to various embodiments.

The shown fan support shroud 214 can be configured to function as an aerodynamic or fluid-flow guide, and can improve fan-related air flow. Therefore forced convection cooling efficiency within blender base power unit 200 can be adjusted and optimized based on needs. Main fan ring 616, as shown, may be the part of the shroud 214 that is be located closest to the blades of the applicable motor cooling fan 212, during or after assembly. However, the shroud 214 can also be configured to improve structural integrity features of the upper housing 230 and lower housing 232 of base power unit 200. The shroud 214 can also facilitate assembly of base power unit 200, preferably by aiding the fastening of various components in a fixed manner during assembly. Air flow from motor 220 can pass through shroud body 618 before reaching main fan ring 616. According to the shown embodiment, shroud body 618 begins with an octagonal shape and tapers to a more circular shape as it approaches main fan ring 616.

To facilitate attachment of the shroud 214 to other blender components (e.g., using fasteners), connection points 610A and 610B can be included. Connection points 610A, as shown, can preferably include an opening to receive a fastener, and are preferably positioned substantially in plane with the main fan shroud body 618. Connection points 610A are preferably located on relatively shorter support arms, as shown. Connection points 610B, however, are shown with longer support arms than those of connection points 610A, and the longer support arms are also shown as protruding below a plane formed by the shroud body 618. In addition, the shroud 214, as shown, preferably has a larger central opening 612, which may be configured to allow the drive shaft 222 driven by a blender motor 220 to pass therethrough. Motor can be attached to lower housing 232 in a fixed manner, for example by slotting motor into a receptacle of lower housing configured to be contoured to motor 220. Fasteners may optionally attach motor to lower housing 232. Additional holes 614 may also be present on the fan support shroud 516, and can serve as holes for fastener attachment to motor 220, according to various embodiments.

Figure 7A:
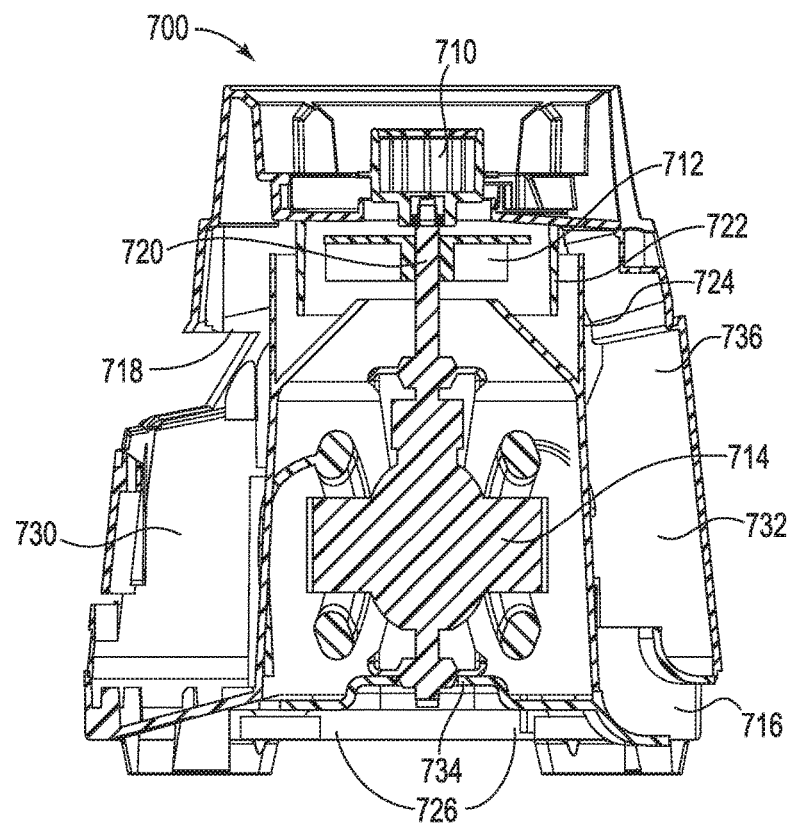
FIG. 7A is a cross-section view of an alternative base power unit of an electric appliance, according to various embodiments.

FIG. 7A is a front cross-section view of an alternative base power unit 700 of a blender, according to various embodiments.

Using similar concepts but in an alternative embodiment, a configuration of a blender base power unit 700 is shown. As in the previous embodiments, a cooling fan 712 is preferably physically located above a motor 714 in its use orientation. In the shown configuration, the motor 714 drives a drive shaft 720 that in turn drives a blender drive nut 710 and the fan 712. As discussed with respect to other embodiments, the blender drive nut 710 can be used to turn a blade in a container (such as container 112 of FIG. 1) in order to blend food and/or beverage contents.

Ambient air may enter power base unit 700 at various intake vents 726, which may be apertures located on a baseplate 734 of base power unit 700. An air flow path 728 may begin once incoming air enters intake vents 726, and the air flow path 728 may pass through and/or around the motor 714 and may enter the fan 712. Once the air heated by the motor 714 is received at the fan 712, the air (and corresponding sound) can then be radially propelled by fan 712 past a first 722 baffle and a second 724 baffle. First and second baffles 722 and 724 can preferably be at least partially cylindrical or ring-like in shape, and may be oriented vertically. Vertical portions of first and second baffles 722 and 724, as shown, can preferably be concentric. First and/or second baffles can be provided and separate components or can be made as part of one or more housing components, herein.

Figure 7B:
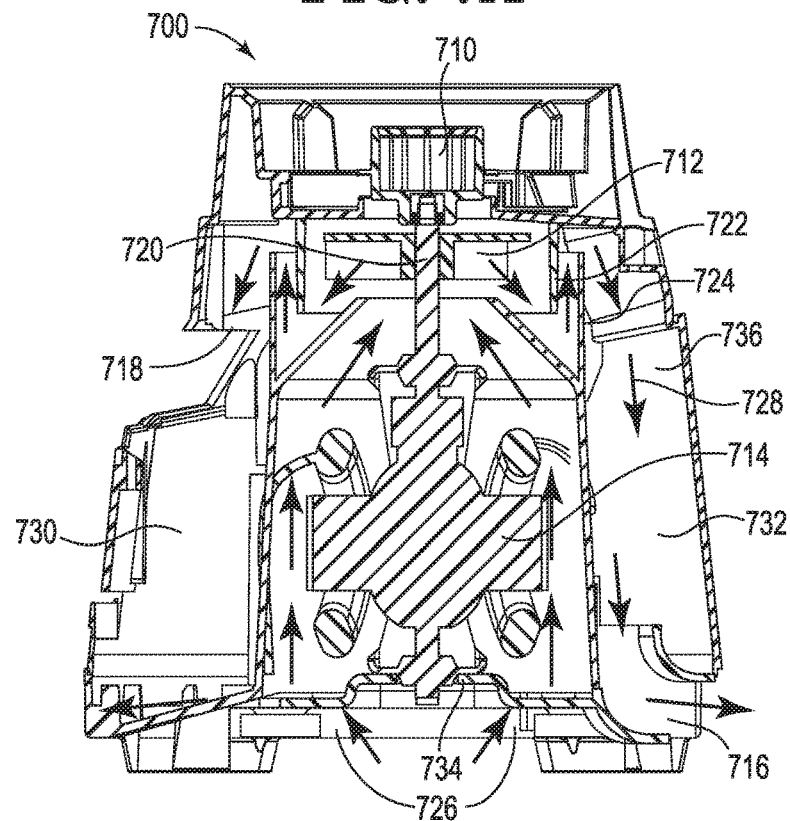
FIG. 7B is a cross-section view of the base power unit of FIG. 7A with an example heat flow path, according to various embodiments.

Insertion of cylindrical smaller-diameter first baffle 722 of upper housing unit 736 into a cylindrical portion of larger-diameter second baffle 724, can preferably form an air flow path 728 that passes in turn by first baffle 722 and second baffle 724. In operation, first and second baffles 722 and 724 can act to partially trap sound (noise) from exiting the applicable base power unit 700, but the first and second baffles 722, 724 may also have a commensurate impact on air flow speed and/or efficiency. Once the air circulates past the first 722 and second 724 baffles, the air may continue and pass through the base power unit collecting cavity 732 and may exit the base power unit at exhaust 716. An example air and thermal heat flow path is depicted with arrows 728 in FIG. 7B, according to various embodiments. Baffle 724 can further include a frustoconical portion, which may be configured to act as a venturi for air entering fan 712. The frustoconical portion may include air flow features similar to shroud 214, described herein. The construction of base power unit 700 including first and second baffles 722, 724 can be better understood with respect to exploded views of base power unit 700 of FIGS. 8A, 8B, and 10.

Figure 8A:
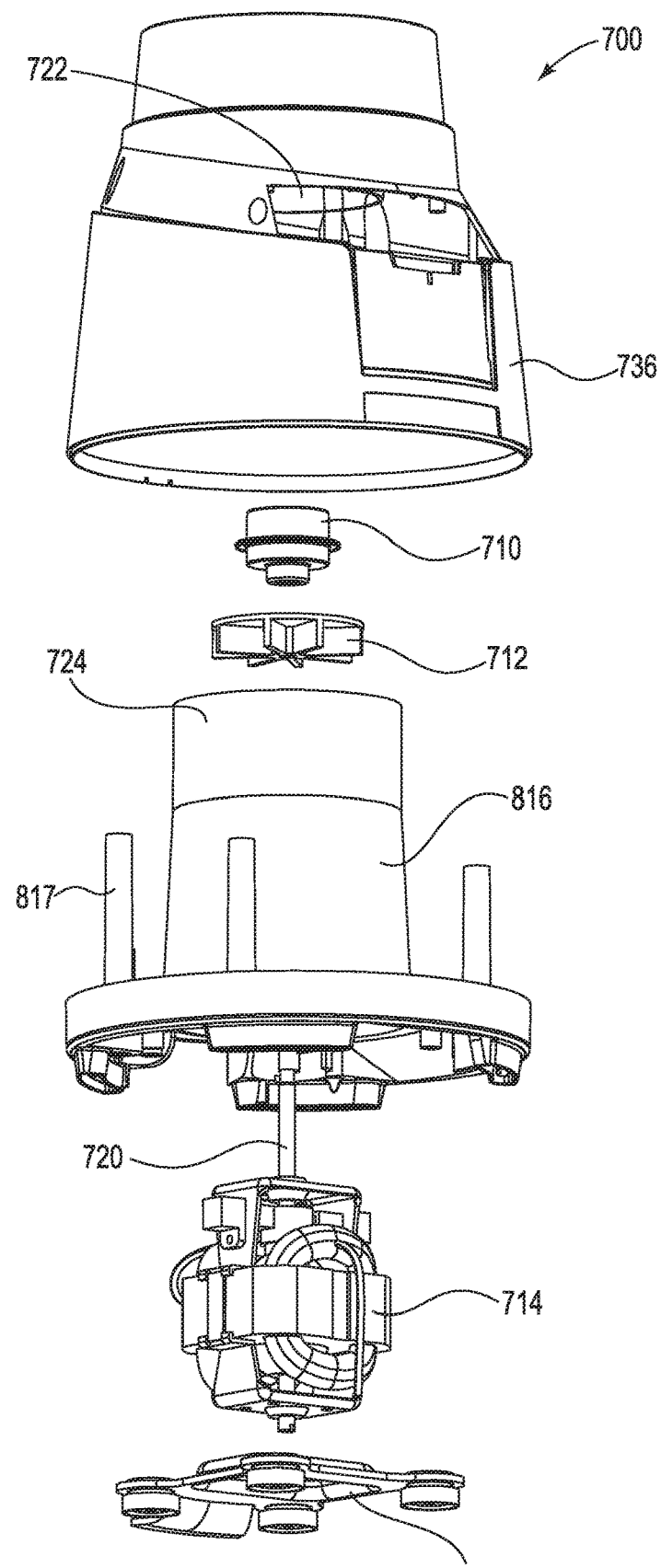
FIG. 8A is a low-angle exploded view of the base power unit of FIG. 7A according to various embodiments.
Figure 8B:
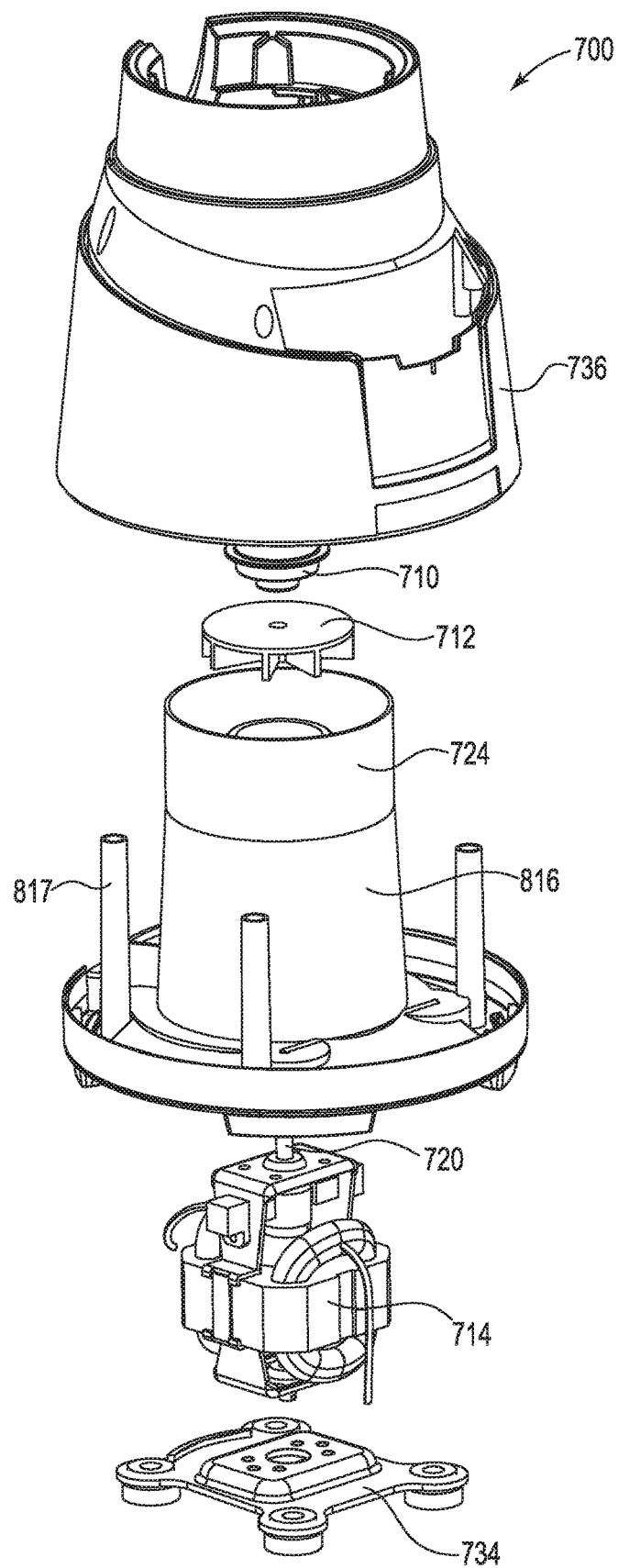
FIG. 8B is a high-angle exploded view of the base power unit of FIG. 7A, according to various embodiments.

FIG. 8A is a low-angle exploded view of the alternative base power unit 700 of FIG. 7A and FIG. 8B is a high-angle exploded view of the alternative base power unit 700 of FIG. 7A, according to various embodiments.

Conceptually related to the exploded views of FIGS. 5A and 5B, FIGS. 8A and 8B show a blender base power unit 700 with several operative key components in exploded form (which would generally be hidden behind base power unit housing 736). From bottom to top (as shown), a base plate 734 can be located below motor 714, followed by drive shaft 720, and motor housing 816 with second baffle 724. Fan 712 is shown located above second baffle 724, but would be located within second baffle 724 during preferable operation and assembly. Above fan 712 is blender connection unit 710 and finally upper housing 736. Upper housing 736 can include first baffle 722, as shown. When assembled upper housing 736, motor housing 816, and base plate 734 may be visible, and the remaining components may be hidden inside the visible components.

Figure 9:
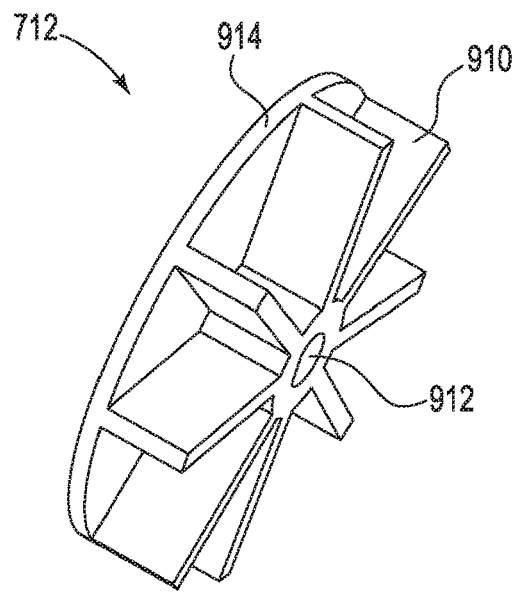
FIG. 9 is a perspective view showing a radial fan as used in FIGS. 7A-8B in greater detail, according to various embodiments.

FIG. 9 shows a radial fan 712 as used in FIGS. 7A-8B in greater detail, according to various embodiments.

As shown, fan 712 is preferably a radial fan configured to move air in an air-cooled apparatus. As shown, fan 712 has a disc portion 914 configured to be rotated in a plane perpendicular to drive shaft 720. Fan can be coupled to a drive shaft (such as drive shaft 222 or drive shaft 720). A respective motor (such as motor 220 or 714) can rotate a drive shaft, and thereby rotate a respective fan (such as fan 212 or 712) coupled to the drive shaft.

As shown, fan 712 includes eight blades 910, which are oriented at ninety degrees from a disc portion 914 of the fan 712. Each blade 910 can preferably be mounted to disc portion 914. Other fan 712 configurations are also contemplated, including a fan 712 having blades 910 of a pitch other than ninety degrees. As shown, disc portion 914 has a substantially similar radius as the fan blade 910 length. According to some embodiments, disc portion 914 may be larger or smaller than a fan blade 910 length. Fan 712 may also have a larger or smaller size, including depth and/or diameter, depending on application and air flow desires.

Figure 10:
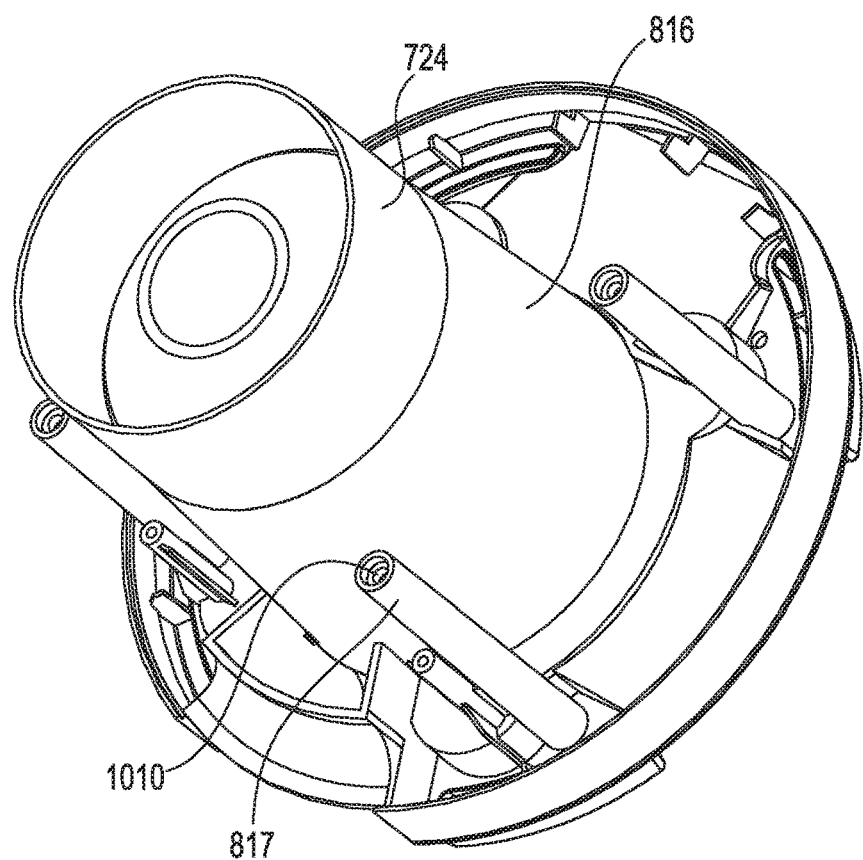
FIG. 10 shows a motor housing for use in an electric appliance, according to various embodiments.

FIG. 10 shows a motor housing 816 for use in a blender in greater detail, according to various embodiments.

As can be seen, motor housing 816 is generally circular in shape, and preferably has second baffle 724 located on top of the motor housing 816. Motor housing 816 may also have a generally frustoconical shape and preferably taper toward second baffle 724. First and second baffles 722 and 724 may together take a form similar to shroud 214, as shown in other embodiments. Also shown are elongate cylindrical standoffs 817. Standoffs 817 can include apertures 1010 for receiving fasteners at a distal end of each standoff 817, and a proximate end of each standoff may be attached to motor housing 816. The standoffs 817 be used for positioning of components during assembly, and for fastening the motor housing 816 to other components, such as upper housing 736 of FIGS. 8A and 8B. Standoffs 817, in conjunction with appropriate fasteners, may give rigidity to motor housing 816 and/or base power unit 700.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A base power unit for a blender, comprising:
   a housing supporting a motor;
   the motor coupled at a first side thereof to a drive shaft extending distally from the motor;
   the drive shaft coupled to a drive element that is positioned distal from the motor along the extension of the drive shaft;
   a shroud operatively supported in position between the motor and the drive element, the shroud providing an input side facing the motor and an output side defining a shaped opening; and
   a fan coupled to the drive shaft that is positioned distal from the shroud and adjacent to the shaped opening of the output side of the shroud along the extension of the drive shaft, wherein the fan is located between the motor and the drive element;
   wherein the housing defines an air flow path passing the motor from an intake vent of the housing positioned to allow air into the housing and to pass along the motor, and wherein the fan receives air after the air enters the housing through the intake vent, passes the motor, and flows through the shroud from its input side to and out of the shaped opening of its output side, and the fan causes the air to pass further through the housing and then out of the housing through an exit vent so that the fan is structurally spaced along the air flow path farther away from at least one of the intake and exit vents than the motor.

2. The base power unit of claim 1, wherein the housing further supports the shroud to direct and concentrate air passing the fan.

3. The base power unit of claim 2, wherein the shroud is further configured to support the motor to the housing.

4. The base power unit of claim 1, wherein the drive element is a blender drive nut.

5. The base power unit of claim 1, wherein the fan is a radial fan with a plurality of fan blades for directing air flow from the shaped opening of the shroud radially.

6. The base power unit of claim 5, wherein the fan includes a disc portion, wherein the plurality of fan blades are mounted to the disc portion at an angle of ninety degrees.

7. The base power unit of claim 1, wherein the housing includes a lower housing and an upper housing, and wherein the lower housing and the upper housing are attached in a clamshell arrangement.

8. The base power unit of claim 1, wherein the intake vent and the exit vent are separated by an air flow divider wall.

9. The base power unit of claim 1, wherein the housing supports at least one baffle located in the air flow path.

10. A blender, comprising:
a container;
a blade located within the container;
a base power unit including a housing supporting a motor, wherein the base power unit is configured to support the container;
the motor coupled at a first side thereof to a drive shaft extending distally from the motor;
the drive shaft coupled to a drive element that is positioned distal from the motor along the extension of the drive shaft, wherein the drive element is coupled to the blade;
a shroud operatively supported in position between the motor and the drive element, the shroud providing an input side facing the motor and an output side defining a shaped opening;
a fan coupled to the drive shaft, wherein the fan is located adjacent to the shaped opening of the shroud and between the shroud and the drive element;
wherein the housing defines an air flow path passing the motor from an intake vent of the housing positioned to allow air into the housing and to pass along the motor, and wherein the fan receives air after the air enters the housing through the intake vent, passes the motor, and flows through the shroud from its input side to and out of the shaped opening of its output side, and the fan causes the air to flow radially from the fan and then to pass further through the housing away from the fan and then out of the housing through an exit vent so that the fan is structurally spaced along the air flow path and farther away from at least one of the intake and exit vents than the motor.

11. The blender of claim 10, wherein the housing further supports the shroud to direct and concentrate air passing the fan.

12. The blender of claim 11, wherein the shroud is further configured to support the motor to the housing.

13. The blender of claim 10, wherein the fan is a radial fan with a plurality of fan blades for directing air flow from the shaped opening of the shroud radially.

14. The blender of claim 13, wherein the fan includes a disc portion, wherein the plurality of fan blades are mounted to the disc portion at an angle of ninety degrees.

15. The blender of claim 10, wherein the housing includes a lower housing and an upper housing, and wherein the lower housing and the upper housing are attached in a clamshell arrangement.

16. The blender of claim 10, wherein the intake vent and the exit vent are separated by an air flow divider wall.

17. The blender of claim 10, wherein the housing supports at least one baffle located in the air flow path.

* * * * *